United States Patent [19] [11] 3,986,248
Meshberg et al. [45] Oct. 19, 1976

[54] METHOD OF MAKING A DISPENSER HAVING A STEPPED MOUNTING CUP

[76] Inventors: Philip Meshberg, 85 Old Oaks Road, Fairfield; Emil David Meshberg, 2625 Park Ave., Apt. 3J, Bridgeport, both of Conn. 06604

[22] Filed: Aug. 5, 1974

[21] Appl. No.: 495,046

Related U.S. Application Data

[63] Continuation-in-part of Ser. No. 415,218, Nov. 12, 1973, abandoned, which is a continuation-in-part of Ser. No. 240,545, April 3, 1973, abandoned.

[52] U.S. Cl. .................................... 29/458; 29/511; 113/121 C; 215/352; 222/402.1
[51] Int. Cl.$^2$ ....................... B23P 3/00; B23P 25/00
[58] Field of Search .............. 29/458, 511; 215/352, 215/343; 222/402.1, 402.18; 113/121 C

[56] References Cited

UNITED STATES PATENTS

| | | | |
|---|---|---|---|
| 3,096,003 | 7/1963 | Nesin | 222/402.18 X |
| 3,443,006 | 5/1969 | Simons et al. | 215/352 X |
| 3,445,023 | 5/1969 | Giessler et al. | 215/352 X |
| 3,506,151 | 4/1970 | La Barge | 215/352 X |
| 3,812,992 | 5/1974 | Walf | 215/352 X |

*Primary Examiner*—Charlie T. Moon
*Attorney, Agent, or Firm*—Kenyon & Kenyon Reilly Carr & Chapin

[57] ABSTRACT

A glass container is molded with a recessed outlet end having a sharp outer edge and an enlarged lip. The outside surfaces of the lip of the container from a point adjacent the recessed opening are straight in part and convexly shaped in another part and terminate in a portion of reduced diameter at the neck of the container. A closure assembly centrally housing an aerosol "or pump-type" valve is formed with a depending flange, an annular stepped portion adjoining the central housing, and a concave surface portion connecting the stepped portion and the depending flange. A liquid elastomeric resin lining is flowed onto the concave surface and depending flange portions and cured to form a resilient liner. The closure assembly is then mounted upon the recessed open end of the glass container forming an inwardly diverging channel between the recessed outlet and enlarged lip of the container on the one hand and the stepped and concave portions of the closure assembly on the other hand. The closure assembly is then secured to the container by the crimping or rolling of the depending flange. This action causes the sharp edge to bite into the elastomeric lining, compresses the resilient lining, causing it to flow in the diverging channel toward the recessed opening of the container and fill the channel, and seals the container. The closure assembly can also be used with a metal bottle and will form a continuous structure with the top edge thereof permitting a simple container structure whose edges will not be deformed when crimped.

8 Claims, 7 Drawing Figures

Fig. 1.
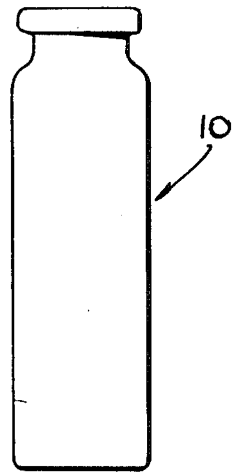
Fig. 2.
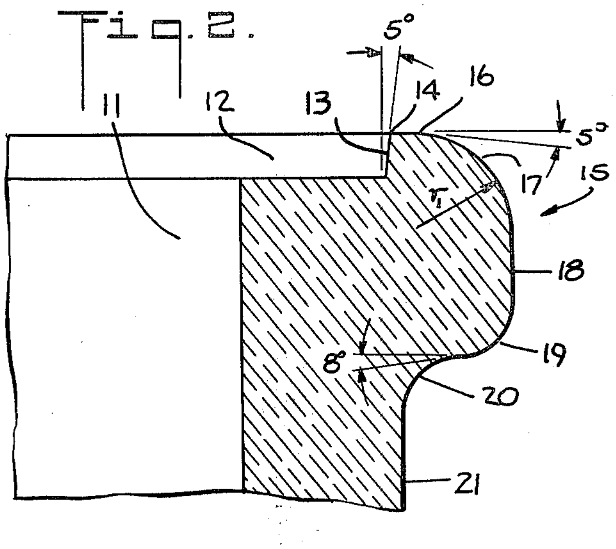
Fig. 3.
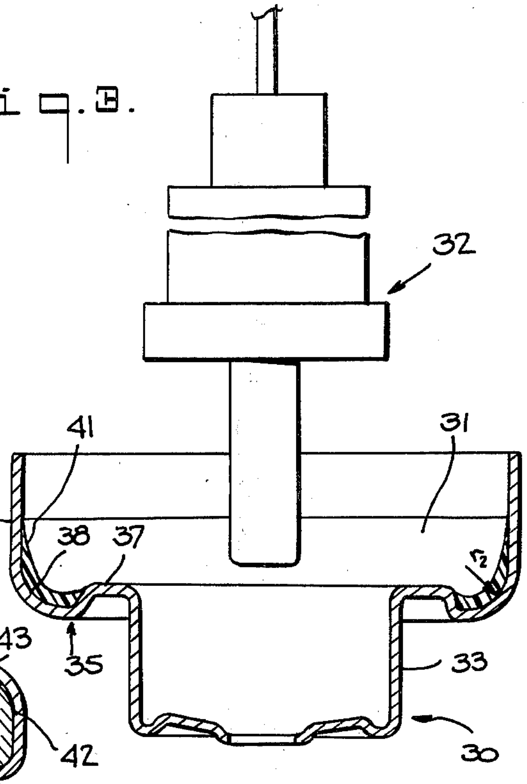
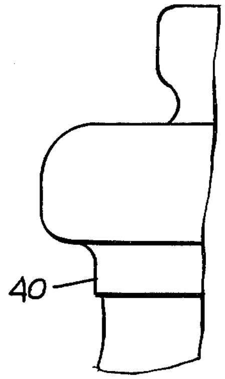
Fig. 5.
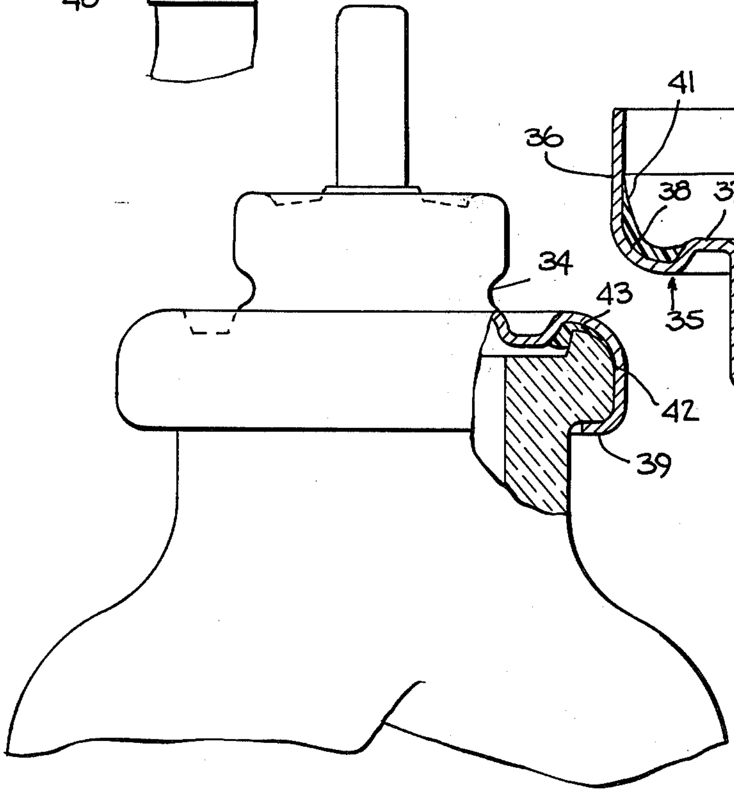
Fig. 4.

METHOD OF MAKING A DISPENSER HAVING A STEPPED MOUNTING CUP

BACKGROUND OF THE INVENTION

This invention is a continuation-in-part of application Ser. No. 415,218 filed Nov. 12, 1973, now abandoned, which is a continuation-in-part of application Ser. No. 240,545 filed Apr. 3, 1973, now abandoned.

FIELD OF THE INVENTION

The invention relates generally to an improvement in the construction of a glass container which is specially adapted for use as the container portion of an aerosol "or pump type dispenser" package. This improvement particularly relates to the construction of the outlet opening and lip of the container to form surfaces which improve the sealing and noncontamination characteristics of the final aerosol package.

The invention further relates generally to an improvement in aerosol dispensers which are used to dispense materials such as perfumes, colognes, deoderant powders, drugs and mouth freshners which, for public acceptance and safety, require noncontamination of such materials prior to use by the consumer. This improvement particularly relates to the use of the specially configured glass container in combination with a closure assembly having performed portions and flowed-in sealing liner which elements coact to provide a defined channel within which the sealing liner is confined, flowed and shaped to expose a reduced area of the liner to contact with the reactive contents of the container and to more effectively seal the container against loss of propellant gas as, for example, in pressurized pump-type or aerosol dispensers.

This invention further relates to metal dispensing containers in general and more particularly to such a container which is easier to manufacture than prior art containers.

DESCRIPTION OF THE PRIOR ART

Prior Glass Bottles with Recessed Outlets

A glass bottle with a recess formed in the open end is known. Waite U.S. Pat. No. 1,814,650 discloses a recessed medicament container.

In general it is also known to specially shape the surfaces of the glass bottle adjacent the recessed opening in order to improve sealing characteristics. Barnard U.S. Pat. No. 1,956,555 discloses the use of inclined surfaces forming the walls of the recessed opening and a sharp edge to bite into the sealing material. De Wallace U.S. Pat. No. 1,717,195 discloses a recessed opening in a glass bottle with a convex inner wall surrounding the recess.

A glass bottle having a recessed opening with a specially configured lip adapted for use in an aerosol package as disclosed herein and achieving the advantage of the applicants' advance in design has not been known before applicants' invention hereof.

Prior Closure Assemblies With Flowed-In Lining In Combination With Glass Bottles Closures having flowed-in linings and used in combination with glass bottles are known, Strickman U.S. Pat. No. 3,344,093 discloses the use of such a lining in a conventional cap for a conventional bottle. Testa et al. U.S. Pat. No. 3,365,089 discloses a flowed-in lining in a cap for use on glass containers.

However, the use of such flowed-in linings with glass aerosol containers has never been realized before the applicants' invention thereof, and particularly not with glass aerosol containers having a recessed outlet opening with a specially configured lip as disclosed herein.

Prior Glass Bottles In Aerosol Packages

It is known to use glass bottles as containers for aerosol dispensers whose contents are retained under pressure by crimping or rolling the aerosol closure assembly to the neck of the botttle. Such a disclosure is made by Ward U.S. Pat. No. 2,788,925.

One problem with Ward type aerosol dispensers which interpose a sealing material between the closure assembly and the glass bottle is that too much of the sealing ring is exposed to the contents of the container. Such exposure inevitably results in the leaching of ingredients of the sealing ring which contaminates the fragrance or taste of the contents of the container causing an unsafe or commercially undesirable product.

As stated above it has not been known before applicants' invention to use a glass aerosol container in combination with a flowed-in lining. And those known aerosol packages having glass containers do not have applicants' unique construction.

Prior Aerosol Closure Assemblies with Flowed-In Lining in Combination With Metalic Containers Flowed-in linings as part of an aerosol closure assembly for conventional metallic containers is known. Applicants' own U.S Pat. No. 2,867,358 discloses an earlier version of the present mounting cup, flowed-in lining, and valve to form an aerosol closure assembly for typical aluminum containers made by impact extrusion and having uniform surfaces for sealing which are characteristic of that process.

However, it has not been known before applicants' invention to use an aerosol closure assembly having applicant' unique improved preformed surfaces and flowed-in lining in combination with a molded glass container to form an aerosol dispenser, and particularly not a glass container with applicants' unique configuration.

The present invention fills a need which the aerosol industry has not sought for some time. A molded glass-containered aerosol package with a flowed-in lining providing excellent sealing and non-contamination characteristics.

METAL BOTTLE CONSTRUCTIONS

In constructing a dispensing container, the general practice is to form the container body with a top portion which is adapted to receive a mounting cup. The mounting cup is constructed with an aerosol valve or other dispensing means such as a pump sealed therein and is then placed over the top of the container and crimped in place. In mounting the mounting cup onto the top of the container, three factors must be taken into consideration. The first of these is the need for a good seal. The second is that, in obtaining this seal, generally by crimping the mounting cup onto the top of the container, the container top must not be deformed. Such deformation would result in a break in the seal. The final consideration is that sealing should be done in a manner which avoids contamination of the material within the container by the sealing gasket. A typical means of insuring that the top of the container does not deform or collapse when the mounting cup is mounted thereon is illustrated by U.S. Pat. No. 3,468,452. As shown therein, the top portion of the container is curled around or beaded to provide additional structural support. Such construction is typical in prior art containers. An example, of the type of means sometimes used for sealing is shown by U.S Pat. No. 3,081,906 wherein special tools are used to assure a good seal between the container top and the mounting cup. It will be obvious that obtaining the bending or beading of the top of the container as shown in U.S. Pat. No. 3,468,452 and crimping and sealing such as shown in U.S. Pat. No. 3,081,906 requires special tooling and will require a number of steps in the forming and crimping of the container and the mounting cup. Thus, it can be seen that there is a need for a means of mounting a mounting cup to the top of a container such that the container can be formed in a simple manner without requiring beading and that crimping may still be accomplished to obtain a good seal and without collapsing the top of the container.

SUMMARY OF THE INVENTION

The present invention lies in the use of a specially configured molded glass container having a recessed outlet opening and a relatively sharp sealing edge surrounded by an enlarged lip having straight and convex surface portions which cooperate with similarly formed stepped and concave portions of the mounting cup of the closure assembly to form a channel therebetween. The channel diverges inwardly and is so dismensioned that the action of securing the container and closure assembly together exerts greater sealing forces on the lining in the narrower portion of the channel than in the wider portion of the channel and causes the resilient flowed-in lining of the aerosol closure assembly to flow inwardly and fill the channel particularly the space between the stepped portion of the mounting cup and the recessed opening of the container adjacent the sharp sealing edge. The matching preformed design of the mounting cup and recessed, shaped glass container when combined, form a space therebetween which presents a minimum area of the sealing liner to exposure to the contents of the aerosol container. The combination provides new and improved sealing characteristics. The present invention also uses the same mounting cup along with a formed metal container to provide the above described advantages. The metal container is formed with a simple lip at its end which terminates in an annula opening with an essentially vertical edge. Such top construction may easily be obtained with a simple stamping operation and does not require the complex bending required to obtain a beaded lip. The stepped portion of the mounting cup is sized to fit within the annular opening in the top of the container so that when the mounting cup is crimped onto the container the stepped portion forms a continuous surface with the top portion of the lip to prevent collapse of the container. Sealing is provided through a flowed-in gasket such as described in my copending application and may be further enhanced by the metal to metal seal which can result between the edges of the container top and the stepped portion of the mounting cup.

BRIEF DESCRIPTION OF THE DRAWINGS

FIG. 1 shows in elevation a glass or metal container.

FIG. 2 shows in section the recessed outlet opening and the specially shaped configuration of the lip of a glass container of FIG. 1.

FIG. 3 shows in partial section the matching preformed shape of the mounting cup with flowed-in liner and valve assembly to form the aerosol closure assembly.

FIG. 4 shows the combination of the mounting cup of FIG. 3 with the class container of FIG. 2 in elevation with a partial section showing the inwardly diverging channel between the container and the closure assembly.

FIG. 5 shows an alternate form of the manner in which the closure assembly is mounted to the container.

DESCRIPTION OF THE PREFERRED EMBODIMENT

Figure 6:
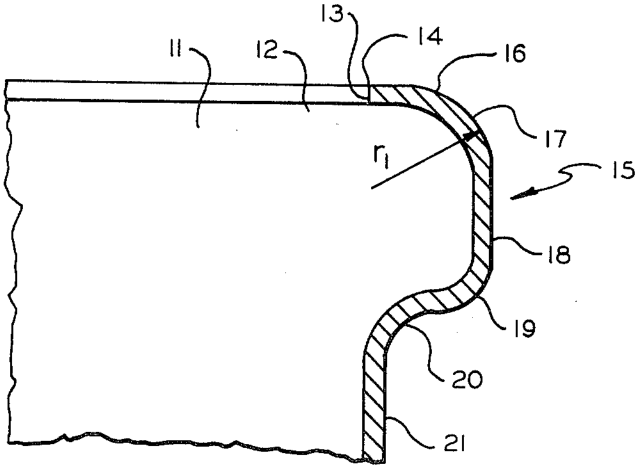
FIG. 6 shows, in section, the outlet opening of the specially shaped lip of a metal container of FIG. 1.

FIGS. 1 and 2 show the applicants' container and the unique configuration which makes it adaptable for use as the container portion of an aerosol dispenser. The container 10 is molded and has a central bore 11. The outlet end of the container 10 has a recess 12 formed therein. The vertical wall 13 of the recess is parallel to the longitudinal axis of the container 10 and terminates at its outer end in a shapr annular sealing edge 14. The enlarged lip of the container, generally referred to as 15 in FIG. 2, is that portion of the container having a portion 18 of maximum predetermined outer diameter and specifically including the adjoining portions from the sharp edge 14 to the neck of the container having the reduced diameter portion 21 shown in FIG. 2. The lip of the bottle, therefore, includes the short upper horizontal portion 16 which is immediately adjacent the sharp edge 14. The horizontal portion 16 is contiguous with the intermediate arcuate portion 17 throughout the entire circumference of the lip and which is a convex quarter circle surface (as viewed from outside the container) made with a predetermined radiu $r_1$. The intermediate portion 17 as contiguous with the lower portion of the lip which includes the portion of predetermined outer diameter 18, the outer surface of which is parallel to the longitudinal axis of the container 10 and extends a predetermined distance parallel to the longitudinal axis of the container, and the bottom-most portions 19, 20 of the lip of the container which have a decreasing outer diameter and are shaped to blend into the neck 21 of the container at a portion of reduced outer diameter, which portions 18, 19, 20 and 21 thereby form a corner for securely mounting the closure assembly to the container as is well known in the art.

The distance from the annular sealing edge 14 to a point on the decreasing diameter portion 19, 20 measured in a vertical plane passed through the longitudinal axis of the container is uniform throughout the entire circumference of the lip. In other words, the enlarged lip is of uniform vertical thickness.

The container 10 is preferably molded from glass. A similarly configured container can be molded from plastic, for example, using the well known plastic designated by the registered Celanese trademark "Celcon."

In molding the glass bottle and in selecting dimensions for the recessed outlet opening, the radius of the arcuate portion 17, the overall lateral thickness of the lip from the central bore to the outside diameter of the portion 18, the overall vertical thickness of the lip from upper portion 16 to lower portion 20, and the thickness of the reduced diameter portion 21, care must be exercised to insure that the lip portion is of sufficient thickness overall to withstand the pressures and stresses of mounting the closure assembly, securing it to the container and pressurizing the container without fracture of the lip.

The slope of surface 13 and 16 which form therebetween the sharp annular sealing edge 14 and the shape of the curved surfaces 19 and 20 which blend to increased diameter portion 18 of the lip into the reduced diameter neck portion 21 have been successfully varied to incorporate parting angles of 5° and 8° shown in FIG. 2, without substantially deviating from the preferred mode of the structure as disclosed.

Although it is preferred that the surfaces 13 and 18 be vertical and that the surface 16 be horizontal, some variation in the slope of these surfaces is possible. Similarly it is permissible to slightly decrease the sharpness of the annular sealing edge 14, but preferably not more than to a radius of about 1/32 inch.

FIG. 3 shows the applicants' closure assembly which comprises the mounting cup 30, the flowed-in liner 31 and the valve assembly 32.

The mounting cup is a stamped, or formed metallic piece preferably made from tin plate or aluminum. It is preformed to a specific configuration which is designed to coact and cooperate with adjacent portions of the recessed end 12 and the lip 15 for the container after it has been mounted on and secured to the container.

The mounting cup 30 is formed with a central housing 33 in which the valve assembly 32 is mounted and crimped 34 to secure it therein, as most clearly shown in FIG. 4. The mounting cup is further formed with a lateral mounting portion generally designated 35 in FIG. 3 and a depending flange 36. The lateral mounting portion 35 is formed into two portions 37, 38. The one portion is a preformed annular stepped portion 37 protruding inwardly toward the container and adjoining the central housing 33. The other portion forms the junction between the stepped portion 37 and the depending flange 36 and is the concave surface (when viewed from inside the container) or annular trough 38. The annular stepped portion 37 protrudes inwardly toward the recessed opening of the container a short distance relative to the depth of the annular trough 38. The concave surface 38 forms an approximate quarter-circle, when measured in a vertical plane passed through the longitudinal axis of the container and is made according to a predetermined radius $r_2$ which is sufficiently larger than and angularly positioned with respect to the cooperating convex surface 17 of the container 10 (which is made of a predetermined radius $r_1$such that when the two surfaces 17 and 38 are brought together, they form a diverging channel for constraining and flowing the sealing member 31, as more fully described below. The central housing 33 extends above the stepped portion 37, the concave portion 38 and the depending flange portion 36.

The lining 31 is flowed into the annular trough 38 while the preformed mounting cup 30 is rotated as is known in the art. The lining 31 due to centrifugal force flows outwardly from the central axis of the mounting cup and moves upwardly along a portion of the depending flange 36. Upon curing the liner forms a resilient, "flowable" lining member as shown in FIG. 3. By "flowable" I mean that the lining is sufficiently soft that when compressed by constraining forces the molecules of the liner will readjust and move toward the area of least constraint.

The lining 31 is preferably a resilient elastomeric resinous material as is known in the art for smooth metal containers.

During the operation of flowing in the lining material, the speed of rotation of the mounting cup 30 and the quantity of flowed-in material used must be controlled so that the liner 31 does not form along the entire depending flange 36 and does not flow out of the annular trough 38 onto the annular stepped portion 37. The portion of the depending flange 36 that is covered with the flowed-in lining is preferably that portion which, when the closure assembly is mounted on the container and secured thereto, is adjacent the vertical surface 18.

The valve 32 is a conventional metered or non-metered aerosol valve or "pump-type" valve.

As shown in FIG. 4, the closure assembly is then mounted upon the outlet opening of the container 10 and the sdepending flange 36 is rolled or crimped around the lip of the container 15 at the portions of reduced diameter 19 and 20 as shown at 39 in FIG. 4 or, alternatively, at the neck 21 of the container 10 as shown at 40 in FIG. 5. The depending flange 36 may be of varying length to accommodate the alternate embodiments.

As shown most clearly in FIG. 4 the preformed stepped protruding portion 37 of the mounting cup is designed to coact with the recessed opening 12 of the container and the convex portion 17 of the lip of the container is designed to coact with the similar concave shaped trough 38 of the mounting cup. Together these cooperating surfaces form a defined channel which generally continuously diverges inwardly from the outer portion 18 of the lip of the container toward the recessed outlet opening 12 of the container within which the elastomeric flowed-in lining 31 is compressed and caused to flow inwardly toward the area of least constraint to fill the space in the channel and particularly in the area adjacent the sealing edge 14. This arrangement exposes a minimum amount of the flowed-in liner to the volatile contents of the aerosol container while at the same time the minor surface variations and imperfections which are inevitable with a molded product are accommodated within the flowed and flowing liner. Thus contamination by interreaction between the container contents and the liner is virtually eliminated or substantially reduced. Further, the disclosed arrangement results in a more effective seal to contain the pressurized contents of the aerosol package in that the annular sealing edge 14 bites into the flowed-in liner and the straight 13, 18 and arcuate 17 shaped surfaces of the lip of the container provide the maximum sealing surface and result in the entire aerosol package having substantially improved sealing characteristics.

Moreover in placing the closure assembly as described and shown upon the container there is a wiping action as the flowed-in liner which is adhered to the depending flange 36, as at 41 in FIG. 3, is first contacted by and wedged against the curved surface 17 and the vertical surface 18 and wiped into the narrow portion of the channel, as indicated generally at 42 in FIG. 4, where the fit is very tight and the stress forces in the lining material are very high. Meanwhile the excess of the liner material beyond that required for the particular fit of a specific closure assembly over a specific container (it being remembered that some production tolerances in molding are evitable and that, regardless a perfect seal is essential) is absorbed in the preferably inwardly diverging channel, as indicated generally at 43 in FIG. 4 where the sealing and the stress forces in the lining material are lower. It is thought that the wiped joint generates extremely high sealing forces in the area of the molded container best able to withstand them, while the large-gap, lower sealing force areas of the channel also accommodate irregularities in the molded container. The result is an entire aerosol package having substantially improved sealing characteristics.

So far as applicants are aware, the present aerosol package is the first such successful combination of a flowed-in liner is a glass-containered-aerosol dispenser having preformed matching sealing surfaces on the outlet end and lip of the container and the closure assembly.

It is noted that when the depending flange 36 is rolled or crimped around the portions of decreasing or reduced diameter 19, 20 and 21, the only portion of the mounting cup that bends is the bottom-most end portion which does not have any of the flowed-in lining thereon.

The rolling or crimping machinery used to secure the closure assembly to the end of the container should do so with predetermined rolling or crimping pressure which incorporates a safety feature such that when the crimping machinery senses a greater than a predetermined, safe, back pressure, it releases the glass container to prevent breaking it.

A specific example that has been found satisfactory and that has been successfully used is as follows: The central bore 11 is 0.406 inches diameter. The recess 12 is 0.031 inches deep and 0.625 inches in diameter. The vertical wall 13 of the recess is inclined outwardly by 5° from the longitudinal axis of the container 10. The flat surface 16 is similarly inclined 5° below the horizontal. The sealing surface 17 is made on a radius of 0.062 inches. The increased diameter portion 18 of the lip has an outside diameter of 0.775 to 0.795 inches diameter. The vertical thickness of the lip is approximately 5/32 inches. The arcuate surfaces 19 and 20 are each made on a radius of 0.031 inches with a parting angle of 8° at the point where they join each other. The outside diameter of the neck portion 21 is 0.640 inches. The predetermined radius $r_2$ of the annular trough 38 of the mounting cup is made sufficiently large so that when it is mounted on the open end of the container it will form the described diverging channel in combination with the straight and arcuate sealing surfaces 16, 17 and 18. A radius of 0.125 inches has been found successful. The completed aerosol dispenser has been pressurized to 25 psi, for an uncoated glass container and to 40 psi, for a coated glass container.

The thickness of the elastomeric lining over the area of the arcuate surface 17 at about location 43 (approximate central portion of surface 17) is 0.025 to 0.030 inches prior to crimping and is reduced to 0.008 inches after crimping, the compression of the lining material also contributing to a tight seal.

Figure 7:
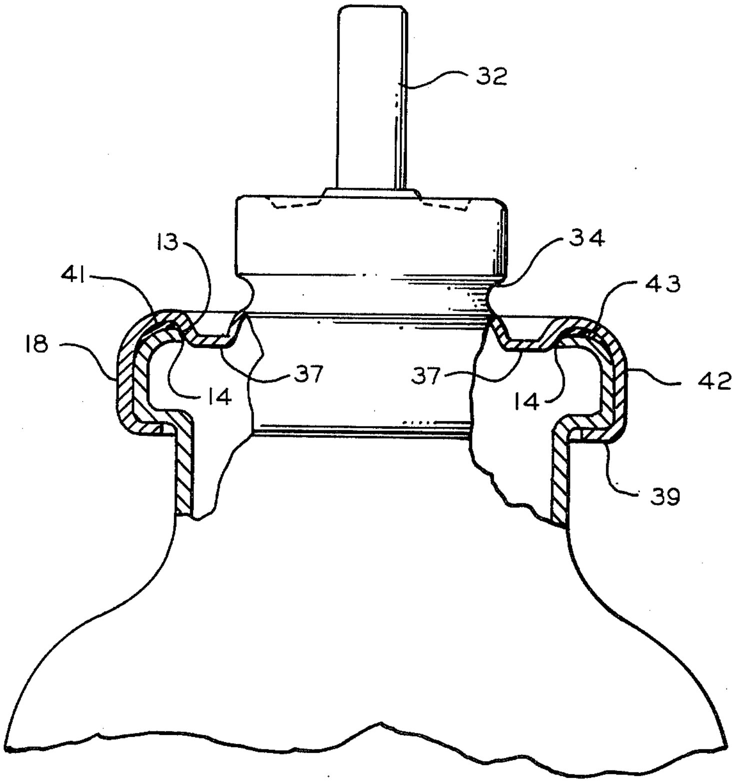
FIG. 7 shows the combination of the mounting cup of FIG. 3 with the metal container of FIG. 6.

The mounting cup of the present invention and the seal it forms can also be used to advantage with metal containers. Such a construction is illustrated by FIG. 6 and 7, the elements of which are designated with reference numerals common to FIGS. 2 and 4 with the same numbers indicating the same portions of the structure. Thus, a tin or aluminum container can be formed to have a lip portion of similar dimensions to that described above in connection with FIG. 2 with the metal end of the container forming the edge 14, and the portion 13 no longer being a recess but now being the inside diameter of the formed lip. The outer appearance of the container would be as illustrated in FIG. 1. The important thing to note is the simplicity of this lip construction as compared to lips used in the prior art. The lip does not have to be beaded or rolled over in the manner done in order to obtain structural soundness in the prior art. As can be seen more clearly from FIG. 7, the edge 14 will essentially butt against the stepped portion 37 of the mounting cup when the cup is placed over the container. When the cup is crimped around the lip, the stepped portion and the end of the lip become a single planar structure and collapse of the lip is avoided. To attain the required structural integrity it is only necessary that a substantial portion of the edge 14 be above the stepped portion 37. In some cases, the application of crimping pressure may cause the stepped portion 37 to become slightly arched to form an extremely strong arch-like structure across the top of the container sealing through the use of the flowed-in liner will occur essentially as described above in connection with the glass container. In addition, it is thought that under certain conditions metal to metal sealing such as is shown at the left-hand portion of FIG. 7 may be obtained.

As noted above, dispensing means are contained within the mounting cup. These dispensing means may comprise an aerosol valve or may be a dispensing pump. In either case the advantages of simplified construction, improved sealing and reduced contamination will result.

Thus, through the use of a stepped mounting cup, an aerosol dispenser can be constructed using a simply formed container. Although a specific embodiment of the invention has been illustrated and described, it will be obvious to those skilled in the art that various modifications may be made without departing from the spirit of the invention which is intended to be limited solely by the appended claims.

We claim:

1. The method of constructing a dispenser comprising:

A. forming a container with a recessed outlet opening having a vertical wall essentially parallel to the longitudinal axis of the container and terminating at its outer end in a sharp, annular sealing edge said outlet opening also having an enlarged lip, B. forming the surface of a closure assembly to have a depending flange, a central housing, a lateral mounting portion made up of an annular stepped portion protruding inwardly toward the container and adjoining the central housing and another portion in the form of a concave surface forming the junction between the stepped portion and the depending flange, C. flowing a resilient lining material onto said concave surface of the closure assembly, D. curing the resilient lining material, E. mounting a dispenser valve securely to the central housing of said closure assembly, F. forming a channel between the recessed opening and enlarged lip of the container on the one hand the stepped and concave surface of the closure assembly on the other hand by closing the outlet end of the container with the closure assembly, and G. compressing and flowing the resilient lining material inwardly in the channel toward the recessed outlet opening of the container to fill the channel with the lining material by securing the closure assembly to the container in sealing realtion thereto.

2. The method of claim 1 wherein the step of forming the container is a molding step.

3. The method of claim 1 wherein the step of compressing and flowing includes wiping a portion of the resilient lining into a narrow portion of the channel the excess liner material beyond that required to fill the space in the narrow portion of the channel being displaced and flowed inwardly into the wider portion of the channel.

4. The method of claim 1 wherein the valve is an aerosol valve.

5. The method of claim 1 wherein said container is a metal container and wherein said step of forming said container includes forming a lip at the end of an essentially cylindrical member of thin metal, said lip having edges which form a circular opening in the top of said member with edges essentially parallel to the longitudinal axis of said member.

6. The method according to claim 5 wherein said lip is formed in a single stamping operation.

7. The method of claim 1 wherein said valve is a pump-type valve.

8. The method of claim 2 wherein said container is a glass container.

* * * * *